US009862842B2

(12) United States Patent
Zheng et al.

(10) Patent No.: US 9,862,842 B2
(45) Date of Patent: Jan. 9, 2018

(54) INFRARED RADIATION ABSORBING ARTICLES AND METHOD OF MANUFACTURE

(71) Applicant: SABIC GLOBAL TECHNOLOGIES B.V., Bergen op Zoom (NL)

(72) Inventors: Liping Zheng, Shanghai (CN); Steven M. Gasworth, Wixom, MI (US); James E. Pickett, Niskayuna, NY (US); Haiying Wang, Shanghai (CN); Zhen Liu, Shanghai (CN); Qijia Fu, Shanghai (CN); Yang Dong, Beijing (CN); Hongxia Xi, Shanghai (CN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 1162 days.

(21) Appl. No.: 13/681,791

(22) Filed: Nov. 20, 2012

(65) Prior Publication Data

US 2013/0224476 A1    Aug. 29, 2013

Related U.S. Application Data

(60) Provisional application No. 61/604,939, filed on Feb. 29, 2012.

(51) Int. Cl.
| | | |
|---|---|---|
| *C09D 5/32* | (2006.01) | |
| *C09D 7/12* | (2006.01) | |
| *C09D 183/06* | (2006.01) | |
| *C09D 183/08* | (2006.01) | |
| *C09D 183/04* | (2006.01) | |
| *B82Y 30/00* | (2011.01) | |
| *C08K 3/22* | (2006.01) | |
| *C08K 3/36* | (2006.01) | |
| *C08G 77/14* | (2006.01) | |
| *C08G 77/24* | (2006.01) | |
| *C08G 77/20* | (2006.01) | |
| *C08K 9/02* | (2006.01) | |

(52) U.S. Cl.
CPC .............. *C09D 5/32* (2013.01); *C09D 7/1216* (2013.01); *C09D 7/1266* (2013.01); *C09D 183/04* (2013.01); *C09D 183/06* (2013.01); *C09D 183/08* (2013.01); *B82Y 30/00* (2013.01); *C08G 77/14* (2013.01); *C08G 77/20* (2013.01); *C08G 77/24* (2013.01); *C08K 3/22* (2013.01); *C08K 3/36* (2013.01); *C08K 9/02* (2013.01); *C08K 2003/2231* (2013.01); *Y10S 977/773* (2013.01); *Y10T 428/254* (2015.01)

(58) Field of Classification Search
None
See application file for complete search history.

(56) References Cited

U.S. PATENT DOCUMENTS

| | | | |
|---|---|---|---|
| 3,986,997 A | 10/1976 | Clark | |
| 4,321,400 A | 3/1982 | Ashby | |
| 4,863,520 A | 9/1989 | Factor et al. | |
| 4,990,376 A | 2/1991 | Patel | |
| 6,180,043 B1 | 1/2001 | Yonemochi et al. | |
| 6,261,694 B1 | 7/2001 | Iacovangelo | |
| 6,319,613 B1 | 11/2001 | Takeda et al. | |
| 6,822,058 B1 | 11/2004 | Kramer et al. | |
| 7,045,213 B2 | 5/2006 | Straus | |
| 7,294,298 B2 | 11/2007 | Iijima | |
| 7,550,193 B2 | 6/2009 | Hu et al. | |
| 7,781,055 B2 | 8/2010 | Chung et al. | |
| 7,883,777 B2 | 2/2011 | Garware et al. | |
| 7,892,647 B2 | 2/2011 | Fisher et al. | |
| 7,927,706 B2 | 4/2011 | Fisher | |
| 7,943,246 B2 | 5/2011 | Barton et al. | |
| 7,952,805 B2 | 5/2011 | McGurran et al. | |
| 7,968,186 B2 | 6/2011 | Rymer et al. | |
| 7,988,881 B2 | 8/2011 | Qi et al. | |
| 8,029,891 B2 | 10/2011 | Phillips et al. | |
| 8,216,670 B2 | 7/2012 | Kumon et al. | |
| 2002/0182422 A1 | 12/2002 | Garrett et al. | |
| 2003/0032721 A1* | 2/2003 | Terry | .................. C09D 183/06 524/837 |
| 2003/0054160 A1 | 3/2003 | Fisher et al. | |

(Continued)

FOREIGN PATENT DOCUMENTS

| | | | |
|---|---|---|---|
| CN | 102153948 A | * | 8/2011 |
| EP | 0877068 A2 | | 11/1998 |

(Continued)

OTHER PUBLICATIONS

Tego Dispers 710Productlit (2015).*

(Continued)

*Primary Examiner* — Kenneth Stachel
(74) *Attorney, Agent, or Firm* — Cantor Colburn LLP

(57) ABSTRACT

In an embodiment, a method for making an infrared radiation absorbing coating mixture comprises: forming an ITO coating mixture comprising ITO and a first coating matrix, wherein the first coating matrix comprises the partial condensate of a silanol, wherein the ITO coating mixture is free of colloidal silica; forming a colloidal silica coating mixture comprising colloidal silica and a second coating matrix, wherein the second coating matrix comprises the partial condensate of a silanol; and mixing the ITO coating mixture with the colloidal silica coating mixture to form a combined mixture. The combined mixture does not comprise a precipitate visible to the unaided eye after 2 weeks without stirring.

14 Claims, No Drawings

(56) References Cited

U.S. PATENT DOCUMENTS

| | | |
|---|---|---|
| 2003/0069350 A1 | 4/2003 | Yoshihara et al. |
| 2004/0131845 A1 | 7/2004 | Fujita |
| 2004/0251451 A1 | 12/2004 | Burgard et al. |
| 2005/0165148 A1 | 7/2005 | Bogerd et al. |
| 2005/0203233 A1 | 9/2005 | Fugiel et al. |
| 2005/0266208 A1* | 12/2005 | Raychaudhuri ........ C09D 5/24 428/143 |
| 2006/0023327 A1 | 2/2006 | Coombs et al. |
| 2006/0097425 A1 | 5/2006 | Okahara et al. |
| 2006/0251874 A1 | 11/2006 | McClure et al. |
| 2006/0257760 A1 | 11/2006 | Mori et al. |
| 2006/0281846 A1 | 12/2006 | Hager et al. |
| 2007/0048519 A1 | 3/2007 | Anderson et al. |
| 2007/0135534 A1 | 6/2007 | Fisher et al. |
| 2007/0203279 A1 | 8/2007 | Jarvis et al. |
| 2007/0210287 A1 | 9/2007 | Guerra |
| 2007/0248809 A1 | 10/2007 | Haldeman et al. |
| 2008/0050579 A1 | 2/2008 | Kirkman et al. |
| 2008/0102282 A1 | 5/2008 | Hu et al. |
| 2008/0265459 A1 | 10/2008 | Gasworth et al. |
| 2009/0087573 A1* | 4/2009 | Saito .................. C09D 1/00 427/421.1 |
| 2009/0291295 A1 | 11/2009 | Chung et al. |
| 2010/0007921 A1 | 1/2010 | Shimada |
| 2010/0027192 A1 | 2/2010 | Perry et al. |
| 2010/0062242 A1 | 3/2010 | De Meyer et al. |
| 2010/0068532 A1 | 3/2010 | Fisher |
| 2010/0080983 A1* | 4/2010 | Anderson ......... B32B 17/10018 428/334 |
| 2010/0098953 A1 | 4/2010 | Hayes et al. |
| 2010/0139855 A1 | 6/2010 | Edler et al. |
| 2010/0220389 A1 | 9/2010 | Villuendas Yuste et al. |
| 2010/0263790 A1 | 10/2010 | Goldfinger et al. |
| 2010/0307670 A1 | 12/2010 | Silverman et al. |
| 2010/0311859 A1 | 12/2010 | Van De Belt et al. |
| 2011/0028730 A1 | 2/2011 | Konemann et al. |
| 2011/0097562 A1 | 4/2011 | Brill et al. |
| 2011/0097586 A1* | 4/2011 | Liao .................. C08F 230/08 428/412 |
| 2011/0144250 A1 | 6/2011 | Meyer et al. |
| 2011/0212318 A1 | 9/2011 | Loebel et al. |
| 2011/0223414 A1 | 9/2011 | Higuchi et al. |
| 2011/0248225 A1 | 10/2011 | Mamak et al. |
| 2012/0021152 A1 | 1/2012 | Glaser et al. |
| 2012/0040179 A1* | 2/2012 | Dave .................. C03C 17/30 428/336 |
| 2013/0071669 A1 | 3/2013 | Kodaira et al. |
| 2015/0079292 A1 | 3/2015 | Takanohashi et al. |
| 2016/0046522 A1 | 2/2016 | Kodaira et al. |
| 2016/0060469 A1 | 3/2016 | Zheng et al. |
| 2016/0060485 A1 | 3/2016 | Zheng et al. |

FOREIGN PATENT DOCUMENTS

| | | | |
|---|---|---|---|
| EP | 2009057 A1 | | 12/2008 |
| GB | 2447414 A | | 9/2008 |
| JP | 2004323661 A | * | 11/2004 |
| WO | 2006049368 A1 | | 5/2006 |
| WO | 2008083918 A1 | | 7/2008 |
| WO | 2009008857 A1 | | 1/2009 |
| WO | 2009056401 A1 | | 5/2009 |
| WO | 2009059901 A2 | | 5/2009 |
| WO | 2010046285 A2 | | 4/2010 |
| WO | 2010090893 A1 | | 8/2010 |
| WO | 2010108837 A1 | | 9/2010 |
| WO | 2010146107 A1 | | 12/2010 |

OTHER PUBLICATIONS

Dispers_610Product Lit (2015).*
Safety Data Sheet EC 1907_2006 Tego Dispers 610 (2016).*
English machine translation of JP2004323661 from JPO(2004).*
Buhler et al.; "One-Pot Synthesis of Highly Conductive Indium Tin Oxide Nanocrystals"; Advanced Materials; vol. 19; 2007; pp. 2224-2227.
Chen et al.; "The Fracture of Brittle Thin Films on Compliant Substrates in Flexible Displays"; Engineering Fracture Mechanics; vol. 69; 2002; pp. 597-603.
Gurev et al.; "ITO Coating of Curved Polymer Substrates"; Proceedings of SPIE; vol. 2262; Sep. 1994; pp. 246-255.
Hayashi et al.; "The Use of Nanoparticles as Coatings"; Materials Science and Engineering; vol. A163; 1993; pp. 157-161.
Minami; "Present Status of Transparent Conducting Oxide Thin-Film Development for Indium-Tin-Oxide (ITO) Substitutes";Thin Solid Films; vol. 516; 2008; pp. 5822-5828.
International Search Report; International Application No. PCT/US2013/027840; International Filing Date: Feb. 27, 2013; dated Jun. 21, 2013; 7 Pages.
Written Opinion of the International Searching Authority; International Application No. PCT/US2013/027840; International Filing Date: Feb. 27, 2013; dated Jun. 21, 2013; 8 Pages.
Puetz et al.; "Direct Gravure Printing of Indium Tin Oxide Nanoparticle Patterns on Polymer Foils"; Thin Solid Films; vol. 516; 2008; pp. 4495-4501.
Song et al.; "Preparation of Indium Tin Oxide Nanoparticles and Their Application to Near IR-Reflective Film"; Current Applied Physics; vol. 6; 2006; pp. 791-795.
International Preliminary Report on Patentability; International Application No. PCT/US2013/027840; International Filing Date: Feb. 27, 2013; dated Jun. 18, 2014; 8 pages.
Chinese Patent No. 102153946; dated Aug. 17, 2011; Machine Translation; 21 pages.
JP2008-030015; dated Feb. 14, 2008; Machine Translation; 35 pages.
JP2010-030792; dated Feb. 12, 2010; Machine Translation; 57 pages.
JP2011-037948; dated Feb. 24, 2011; Machine Translation; 64 pages.

* cited by examiner

INFRARED RADIATION ABSORBING ARTICLES AND METHOD OF MANUFACTURE

CROSS-REFERENCE TO RELATED APPLICATION

The present application claims priority to provisional application Ser. No. 61/604,939, filed Feb. 29, 2012, which is incorporated herein by reference in its entirety.

BACKGROUND

Disclosed herein are infrared radiation absorbing coatings, articles comprising the coatings, and methods for making and using the same.

Use of polymeric based glazing materials in automotive applications has raised certain problems. This is due, at least in part, to the unique challenges posed by automotive service conditions. While not an exhaustive list, these include: extremes of temperature and environmental exposure; intense and prolonged vibrational forces transmitted through the glazing material during normal operation of the automotive vehicle; occasional instances of intense shock and impact loads which may be randomly exerted on the glazing material; scratching of the surface by incidental contacts such as in washing of the vehicle or the impacting of dust and other particles; and routine though prolonged exposure to debilitating environmental factors such as rain and the ultraviolet and infrared radiation in sunlight.

Another problem encountered in the use of polymeric based glazing materials (e.g., polycarbonate) in automotive glazing applications is the need to reduce penetration of solar infrared radiation through the windows into the automobile interior, creating undesirable heat loads, particularly during summer months. While a similar problem has been encountered with silica based glass compositions in automotive glazing applications, the heat load problem can be addressed with the use of inorganic glass coatings or additives which can be integrated during glass formation or in suitable post formation steps. Heretofore, methods and strategies for reducing the heat load potential for polycarbonate based glazing compositions suitable for use in automotive applications has been more problematic. Some issues encountered include incompatibility of materials, conflicting properties, and so forth.

What is needed in the art is a plastic article that is transparent, infrared radiation absorbent, abrasion resistant, and has low haze.

BRIEF DESCRIPTION

Disclosed herein are silicone hard coats comprising indium-doped tin oxide (ITO), articles comprising the silicone hard coat, and methods for making the same.

In an embodiment, a method for making an infrared radiation absorbing coating comprises: forming an ITO coating mixture comprising ITO and a first coating matrix, wherein the first coating matrix comprises the partial condensate of a silanol of the formula $R_nSi(OH)_{4-n}$, where n equals 1 or 2, and wherein R is selected from a $C_{1-3}$ alkyl radical, a vinyl radical, a 3,3,3-trifluoropropyl radical, a gamma-glycidoxypropyl radical, and a gamma-methacryloxypropyl radical, wherein the ITO coating mixture is free of colloidal silica; forming a colloidal silica coating mixture comprising colloidal silica and a second coating matrix, wherein the second coating matrix comprises the partial condensate of a silanol of the formula $R_nSi(OH)_{4-n}$, where n equals 1 or 2, and wherein R is selected from an alkyl radical of 1 to 3 inclusive carbon atoms, a vinyl radical, a 3,3,3-trifluoropropyl radical, a gamma-glycidoxypropyl radical, and a gamma-methacryloxypropyl radical; and mixing the ITO coating mixture with the colloidal silica coating mixture to form a combined mixture. The combined mixture does not comprise a precipitate visible to the unaided eye after 2 weeks without stirring.

In an embodiment, a silicone coating composition comprises: a coating matrix, comprising the partial condensate of a silanol of the formula $R_nSi(OH)_{4-n}$, where n equals 1 or 2, and wherein R is selected from a $C_{1-3}$ alkyl radical, a vinyl radical, a 3,3,3-trifluoropropyl radical, a gamma-glycidoxypropyl radical, and a gamma-methacryloxypropyl radical; colloidal silica; and ITO having a mean particle size of less than or equal to 60 nm as determined by dynamic light scattering.

In another embodiment, a silicone coating composition comprises: a coating matrix comprising the partial condensate of a silanol of the formula $R_nSi(OH)_{4-n}$, where n equals 1 or 2, and wherein R is selected from a $C_{1-3}$ alkyl radical, a vinyl radical, a 3,3,3-trifluoropropyl radical, a gamma-glycidoxypropyl radical, and a gamma-methacryloxypropyl radical; ITO having a mean particle size of less than or equal to 60 nm as determined by dynamic light scattering; and wherein the silicone coating is free of colloidal silica.

The above described and other features are exemplified by the following detailed description.

DETAILED DESCRIPTION

It is desirable to provide an article (e.g., a glazing article), e.g. for automotive or architectural application, with a specified balance between visible light transmittance "Tvis" (higher is generally better) and total solar transmittance "Tts" (lower is generally better). For a given Tts, higher Tvis can extend the glazing color range, thereby affording greater design flexibility. For a given Tvis, lower Tts can lower air conditioning demand on hot sunny days, which can improve fuel economy or electric range. However, these characteristics, Tts and Tvis, tend to be in conflict. More specifically, it is desirable to achieve a balance of Tvis and Tts for plastic-based glazing, while meeting application-dependent requirements for uniformity of appearance and optical function, haze (i.e., forward light scattering), abrasion-resistance, color, and weatherability, within applicable manufacture-related limitations (e.g. on additive concentration in plastic resin).

Specifically, it is desirable to provide an article that maintains the properties of current articles, yet further has infrared ("IR") absorbance properties. Plastic materials often do not have adequate abrasion resistance for automotive or glazing applications. Typically, they are coated with weatherable, abrasion resistant coatings. Particularly desirable coatings are silicon hard coats comprising condensed silanols, colloidal silica, and ultraviolet (UV) absorbers. Examples include AS4000, AS4010, and AS4700 available commercially from Momentive Performance Materials. Due to the incompatibility of ITO with colloidal silica as well as the color that many IR absorbers impart to the composition, the particular IR absorbers that can be employed in a silicone hard coat have been very limited. Hence, for example, the use of metal oxide nano-particles, particularly ITO, has been very limited. Where the use of ITO has been attempted, the optical clarity and thermal stability of the article was unacceptably reduced (for example, see EP2009057 B1 to Nakae).

Disclosed herein are glazing articles comprising the following elements: a substrate (also referred to as a glazing), infrared absorbent (IR) coating(s) on either or both sides of the substrate, and optional layer(s) (e.g., weatherable coatings, primers, and so forth). As used herein, layer includes film (free standing before attaching to the article), and coating (created on the article). Disposed in one or more locations (e.g., same or different: coating(s), film(s), and/or substrate) in the article can be two or more different additives with respective spectral properties that are complementary to attain a desired resultant transmission spectrum (e.g., with respect to visible light transmittance and total solar transmittance). The additives can be strategically placed in the glazing article relative to the component in which the glazing article will be employed (e.g., a vehicle or building interior or exterior), and/or relative to other functional elements, such as UV absorbing and/or abrasion-resistant coatings.

Some additives discernibly affect color of the host (substrate, film and/or coating(s)); others do not. In cases where the coating application method (e.g. flow or dip coating) tends to produce a gradient in coating thickness, it is preferable to locate the color affecting additives in the substrate or film (if used) or in an in-mold coating (e.g., commonly assigned U.S. Patent Publication No. 2008/0265459) or in a coating deposited under vacuum, so as to provide a uniform distribution, and hence a uniform function and appearance. Additives that do not discernibly affect color (at practical concentrations) can be located in coating(s) with thickness gradients without generating non-uniform appearance, provided functional requirements are met over the range of coating thickness. In addition to providing appropriate spectral properties, the additives are soluble or form stable dispersions in the respective hosts, do not impart unacceptable haze, and are stable both during manufacturing (e.g. UV or thermal curing of coatings) and in service.

The substrate can comprise plastic (e.g., a transparent plastic) such as polycarbonate resin, acrylic polymers, polyacrylate, polyester, polysulfone resins, as well as combinations comprising at least one of the foregoing. The polycarbonate resins can be aromatic carbonate polymers which may be prepared by reacting dihydric phenol(s) with a carbonate precursor such as phosgene, a haloformate, or a carbonate ester. One example of a polycarbonate which can be used is LEXAN* polycarbonate, commercially available from SABIC Innovative Plastics, Pittsfield, Mass.

Acrylic polymers can be prepared from monomers such as methyl acrylate, acrylic acid, methacrylic acid, methyl methacrylate, butyl methacrylate, cyclohexyl methacrylate, and the like, as well as combinations comprising at least one of the foregoing. Substituted acrylates and methacrylates, such as hydroxyethyl acrylate, hydroxybutyl acrylate, 2-ethylhexylacrylate, and n-butylacrylate can also be used.

Polyesters can be prepared, for example by the polyesterification of organic polycarboxylic acids (e.g., phthalic acid, hexahydrophthalic acid, adipic acid, maleic acid, terephthalic acid, isophthalic acid, sebacic acid, dodecanedioic acid, and so forth) or their anhydrides with organic polyols containing primary or secondary hydroxyl groups (e.g., ethylene glycol, trimethylene glycol, butylene glycol, neopentyl glycol, and cyclohexanedimethanol).

Polyurethanes are another class of materials which can be used to form the substrate. Polyurethanes can be prepared by the reaction of a polyisocyanate, with a polyol, polyamine, or water. Examples of polyisocyanates include hexamethylene diisocyanate, toluene diisocyanate, diphenylmethane diisocyanate (MDI), isophorone diisocyanate, and biurets and thiocyanurates of these diisocyanates. Examples of polyols include low molecular weight aliphatic polyols, polyester polyols, polyether polyols, fatty alcohols, and the like.

Examples of other materials from which the substrate may be formed include acrylonitrile-butadiene-styrene polymers, VALOX* (polybutylenephthalate, commercially available from SABIC Innovative Plastics), XENOY* (a blend of LEXAN* and VALOX*, commercially available from SABIC Innovative Plastics), and the like. Also included are combinations with any of the above substrate materials.

The substrate can be formed in various manners such as by injection molding, extrusion, cold forming, vacuum forming, blow molding, compression molding, transfer molding, thermal forming, and so forth. The article may be in any shape and need not be a finished article of commerce, that is, it may be sheet material or film which would be cut or sized or mechanically shaped into a finished article.

The transparent plastic substrate may include bisphenol-A polycarbonate and other resin grades (such as branched or substituted) as well as being copolymerized or blended with other polymers such as polybutylene terephthalate (PBT), poly-(acrylonitrile-butadiene-styrene) (ABS), polyarylates, or polyethylene.

The transparent plastic substrate can further comprise various additive(s), such as colorant(s), mold release agent(s), antioxidant(s), surfactant(s), plasticizer(s), IR absorber(s), antistat(s), antibacterial(s), flow additive(s), dispersant(s), compatibilizer(s), UV absorber(s), and a combination comprising at least one of the foregoing additives.

Weathering layer(s) can optionally be applied to one or both sides of the substrate. The layer can have, for example, a thickness of less than or equal to 100 micrometers (m), specifically, 4 μm to 65 μm. The weathering layer(s) can include UV absorbing material (e.g., hydroxybenzophenone(s), hydroxyphenylbenzotriazole(s), hydroxyphenyltriazine(s), polyaroylresorcinol(s), and cyanoacrylate(s), as well as combinations comprising at least one of the foregoing). The weathering layer(s) can be, for example, a polyurethane (e.g., a polyurethane-acrylate), acrylate, silicone-based material, fluorocarbon (e.g., polyvinylidene fluoride), acrylic material, as well as combinations comprising at least one of the foregoing. Desirably, the weathering layer has a Taber delta haze (abrasion resistance test) of less than 10%, specifically less than or equal to 5%. As used herein, Taber delta haze is determined using CS-10F wheels, a 500 gram (g) load, and 500 cycles as specified by ASTM D1044-08.

The IR coating can be a silicone hard coat with metal oxide nano-particles. Such coatings can provide low haze, weatherability, UV-absorption, and abrasion-resistance. As used herein, weatherability refers to no cracking (per the unaided eye with normal 20/20 vision) and no delamination (per tape test according to ASTM D3359-08), after weatherability testing in Florida, outdoors, for a period of at least 3 years and at an angle of 5 degrees. This may be simulated by exposure to at least 9 megajoules per square meter per nanometer ($MJ/m^2/nm$) measured at 340 nanometers (nm) in a xenon arc weathering device using a protocol employing daylight filters such as described in ASTM G155-05. As used herein, haze is determined in accordance with ASTM D1003-11, procedure A with CIE standard illuminant C (see ISO/CIE 10526). Desirably, the coated glazing (substrate with the IR coating), has a haze of less than 5%, specifically, less than or equal to 3%, and more specifically, less than or equal to 1.5% and yet more specifically, less than or equal to 1%.

Examples of metal oxide nano-particles include indium-doped tin oxide (ITO), antimony-doped tin oxide (ATO), fluoride-doped tin oxide (FTO), gallium-doped zinc oxide (GZO), aluminum-doped zinc oxide (AZO), indium-doped zinc oxide (IZO), and combinations comprising at least one of the foregoing. Desirably, the metal oxide nano-particles have a mean particle size of less than or equal to 60 nanometers (nm), specifically, less than or equal to 45 nm, and more specifically less than or equal to 40 nm, and more specifically, 10 nm to 30 nm, as determined by dynamic light scattering (DLS). Specifically, greater than or equal to 90% of particles can have diameters of less than 61 nm, more specifically, greater than or equal to 95% can have diameters of less than or equal to 71 nm. Agglomeration of nano-particles with each other can be inhibited by suspending metal oxide nano-particles in solvent before addition to a coating matrix; by suitable nano-particle surface modification; and/or by observing concentration limits.

ITO has proven particularly useful for IR absorption, but has previously not been readily employed while maintaining weatherability and abrasion resistance (e.g., Taber delta haze). ITO is generally purchased in the form of a dispersion. When the ITO dispersion is combined with a colloidal silica coating mixture (i.e., a coating mixture comprising partially condensed silanols and colloidal silica), agglomeration (manifested as precipitation and/or high turbidity) occurs. The severity of the agglomeration is such that it is visible to the unaided eye. In other words, when an ITO dispersion is combined with a colloidal silica coating mixture, precipitation occurs in less than or equal to one week. As used herein, unless specified otherwise, visible refers to visible to the unaided eye. As used herein, unaided eye refers to normal 20/20 vision.

In one embodiment, di and/or trialkoxy silanes (without colloidal silica), and optionally including additive(s) and the like, are mixed with ITO (also referred to herein as an ITO dispersion which is ITO as received from the supplier) to form an ITO coating mixture. The ITO is received as a dispersion for ease of handling, e.g., dispersed in a solvent such as water, an alcohol (e.g., isopropyl alcohol (IPA)), or a combination comprising at least one of the foregoing. For example, ITO can be purchased commercially from Shanghai Huzhen Nano Technology Co. Ltd., under the product code ITO-MP030 comprising 30 wt % ITO and 70 wt % isopropyl alcohol. The ITO coating mixture can be applied to the substrate to attain the desired IR protection. Since colloidal silica is not present in this embodiment, the advantages (e.g., abrasion resistance) attained therewith are also not present.

A silicone coating matrix can comprise a lower aliphatic alcohol-water mixture of the partial condensate of silanol(s) of the formula $R_nSi(OH)_{4-n}$ where n equals 1 or 2 and R is selected from alkyl radicals of 1 to 3 inclusive carbon atoms, a vinyl radical, a 3,3,3-trifluoropropyl radical, a gamma-glycidoxypropyl radical, and a gamma-methacryloxypropyl radical. Optionally, greater than or equal to 70 wt % of the silanol can be $CH_3Si(OH)_3$. When a mixture is made with the silicone coating matrix, the mixture can comprise colloidal silica or ITO, and can comprise 10 to 50 weight percent solids including 10 to 90 weight percent of the partial condensate. Optionally, the mixture can comprise sufficient acid to have a pH of 3.0 to 6.0.

A colloidal silica coating mixture comprises a colloidal silica dispersion and the silicone coating matrix. The colloidal silica coating mixture can contain 10 to 50 wt % solids with the solids comprising 10 to 80 wt % colloidal silica and 20 to 90 wt % of the partial condensate, and optionally sufficient acid to provide a pH of 3.0 to 6.0. Examples of colloidal silica coating mixtures are disclosed in U.S. Pat. No. 3,986,997 to Clark. Further examples of colloidal silica coating mixtures include such silicone resin coating solutions such as AS4010 or AS4700 (commercially available from Momentive Performance Materials). There can be additives introduced before or after the colloidal silica dispersion is combined with the silicone coating matrix.

An ITO coating mixture comprises an ITO dispersion and the silicone coating matrix. The ITO coating mixture can contain 10 to 50 wt % solids with the solids comprising 10 to 70 wt % ITO and 30 to 90 wt % of the partial condensate, and optionally sufficient acid to provide a pH of 3.0 to 6.0. There can be additives introduced before or after the ITO dispersion is combined with the silicone coating matrix. The ITO nano-particles can be incorporated into the silicone coating matrix via suitable processing steps and under suitable processing conditions to produce an ITO coating mixture, for example, by stirring for greater than or equal to 24 hours.

As noted above, when the ITO is directly combined with a colloidal silica coating mixture, agglomeration of ITO nano-particles with colloidal silica (CS), generally occurs (e.g., without the addition of polymeric dispersant). It has been discovered, however, that the incompatibility between ITO and colloidal silica can be overcome, i.e., it is now possible for ITO and colloidal silica to co-exist in a common coating mixture without agglomeration of the ITO nano-particles, e.g., without visible turbidity or precipitation for a period of two weeks, and even for more than two weeks. This compatibility can be attained even without adding a polymeric dispersant (e.g., polymethylmethacrylate) to the ITO dispersion received from the supplier. In other words, the ITO coating mixture can comprise less than or equal to 0.05 parts by mass polymeric dispersant with respect to 1 part by mass ITO, specifically, less than or equal to 0.01 parts by mass polymeric dispersant with respect to 1 part by mass ITO, and more specifically 0 parts by mass polymeric dispersant. It was discovered that ITO and colloidal silica can be introduced respectively into separately prepared silicone coating matrices which, after the resulting coating mixtures are individually aged, can be combined to form a combined mixture comprising the coating matrices, ITO, colloidal silica, and any optional additive(s). In other words, the combined mixture can have an amount of polymeric dispersant such that if the ITO (e.g., ITO dispersion) were mixed directly with the colloidal silica coating mixture to form a sample mixture having the same amount of polymeric dispersant as the combined mixture, precipitation occurs in the sample mixture in less than or equal to one week with no agitation One separately prepared mixture, the ITO coating mixture, contains a silicone coating matrix, ITO, no colloidal silica (e.g., 0 wt % colloidal silica based upon a total weight of the ITO coating mixture), and optionally further contains cure catalyst(s), UV absorber(s), and optionally other additive(s). Another mixture, the colloidal silica coating mixture, contains a silicone coating matrix, colloidal silica, no ITO (e.g., 0 wt % ITO based upon a total weight of the colloidal silica coating mixture), and optionally further contains cure catalyst(s), UV absorber(s), and optionally other additive(s). Each mixture, the ITO coating mixture and the colloidal silica coating mixture, can be aged prior to forming the single mixture, i.e., the combined mixture. The aging time is dependent upon the exact formulation, with sufficient time and agitation such that a combined mixture (the combination of the ITO coating mixture and the colloidal silica coating mixture) is obtained which exhibits no visible precipitation (to the unaided eye) for at least two weeks without agitation. Aging can be achieved by agitation (e.g., stirring at room temperature) for greater than or equal to 1 day (e.g., 1 day to 2 weeks) or by warming to 35° C. to 65° C. and agitating (e.g., stirring) for greater than or equal to an hour (e.g., for one hour to one day).

Possible additives that can be employed with the coating mixture(s) include colorants, antioxidants, surfactants, plasticizers, IR absorbers (e.g., in addition to the ITO), antistats, antibacterials, flow additives, dispersants, compatibilizers, cure catalysts, UV absorbers, and a combination comprising at least one of the foregoing additives.

Once the ITO coating mixture has been aged, then, the combined mixture can be formed by combining (e.g., blending) the separately prepared ITO coating mixture and colloidal silica coating mixture. Desirably, the combined mixture is formed once the ITO coating mixture and colloidal silica coating mixture have been aged. As is noted above, one or both of the separately prepared mixtures (i.e., the ITO coating mixture and/or the colloidal silica coating mixture) can contain UV absorbers (UVA), cure catalyst, as well as other additive(s) as desired. UV absorber(s), cure catalyst(s), and other optional additive(s) also can be added to the combined mixture at the time of mixing or later as desired.

In various embodiments, the colloidal silica coating mixture (with colloidal silica and without ITO) could be a silicone hard coat mixture such as AS4010 or AS4700 (commercially available from Momentive Performance Materials). The coating matrix to be mixed with the ITO can be the same composition as the coating matrix for the colloidal silica mixture (e.g., the same as AS4010 or AS4700 without the colloidal silica). This allows the use of the same UV absorber at the same loading in the ITO coating mixture, yielding the same UV absorber loading in the combined mixture as in the standard silicone hard coat, e.g., as is currently employed to attain the desired properties, with the additional benefit of enhanced IR absorption properties.

Alternatively, the colloidal silica coating mixture can have higher than standard UV absorber and/or colloidal silica loadings to compensate for dilution by the ITO coating mixture containing no colloidal silica, and optionally no UV absorber. The combined mixture (i.e., the combined ITO and colloidal silica coating mixtures) can therefore have the same UV absorber and colloidal silica loadings as in a conventional silicone hard coat mixture but with the addition of the ITO. In other words, the loading of each component in the coating mixtures can be determined based upon a desired loading of the combined mixture (comprising the ITO coating mixture and the colloidal silica coating mixture). Furthermore, due to this method of making the combined mixture, ITO and colloidal silica can be combined in a single mixture without adding additional polymeric dispersant. Besides optionally purifying the ITO dispersion and/or ITO coating mixture, the ITO dispersion can be used as purchased from a supplier. In some embodiments, the combined mixture is free of polymeric dispersant.

The concentration of the metal oxide nano-particles, namely ITO, in the combined mixture is based upon the desired concentration in the final, cured coating. The concentration of ITO nano-particles in the final cured coating is partially dependent upon the particular application of the coated article (e.g., the allowable haze and desired transmission). Generally, 2 wt % to 40 wt % can be present, specifically, 5 wt % to 40 wt %, more specifically, 5 wt % to 35 wt %, and yet more specifically, 5 wt % to 20 wt % or 15 wt % to 25 wt %, based upon a total weight of the cured coating (i.e., total coating solids in the final cured coating). To meet requirements specified for luminous transmittance for Item 2 glazing for motor vehicles in the American National Standards Institute's ANSI Z26.1-1996 specification, the concentration of metal oxide nano-particles can be 10 wt % to 40 wt %, specifically, 15 wt % to 35 wt %, more specifically, 20 wt % to 30 wt %, based upon a total weight of the cured coating (i.e., total coating solids in the final cured coating). In an Item 3 glazing application (e.g., wherein the substrate properties are less constrained such that it can comprise greater IR absorbers), however, (e.g., for a rooflite), the concentration of metal oxide nano-particles can be 2 wt % to 25 wt %, specifically, 5 wt % to 15 wt %, based upon a total weight of the cured coating (i.e., total coating solids in the final cured coating).

In various embodiments, the addition of the ITO nano-particles to a colloidal silica mixture unacceptably increased the initial haze of articles coated therewith. For example, the initial haze was greater than or equal to 20%. It was discovered that colloidal silica coating mixtures comprising either ammonium-stabilized colloidal silica (e.g., commercially available from Nalco Company; Nalco 2327) or acid-stabilized colloidal silica (e.g., commercially available from Nalco Company; Nalco 1034A) behave the same. Namely, (i) adding colloidal silica (e.g., acid-stabilized or ammonium stabilized) to an ITO/IPA dispersion leads to agglomeration; and (ii) combining an ITO/IPA dispersion with a silicone hard coat mixture containing colloidal silica (e.g., acid-stabilized or ammonium stabilized) also led to agglomeration. However, as with the ammonium-stabilized colloidal silica containing coating mixture, applying the method disclosed herein (i.e. combining the ITO coating mixture with a colloidal silica coating mixture containing Nalco 1034A after aging (about 10 hours for the latter), provided a low haze coating, i.e. no agglomeration.

Not to be limited by theory, sometimes, we found that the presence of ITO, or possibly impurities in the ITO, in the combined coating mixture led to higher Taber delta haze of the coated article as compared with the case with no ITO. Hence, further reduction of the Taber delta haze can be accomplished with the addition of a cure catalyst in one of more of the ITO coating mixture, the colloidal silica coating mixture, and the combined coating mixture. Quaternary ammonium salts of carboxylic acids can be used as cure catalysts. Specific examples of cure catalysts include tetra-n-butylammonium acetate (TBAA), tetra-n-butylammonium formate, tetra-n-butylammonium benzoate, tetra-n-butylammonium-2-ethylhexanoate, tetra-n-butylammonium-p-ethylbenzoate, and tetra-n-butylammonium propionate. The amount of cure catalyst can be less than or equal to 2 weight percent (wt %), specifically, 0.01 wt % to 2 wt %, more specifically, 0.05 wt % to 1.5 wt %, still more specifically, 0.1 wt % to 1 wt % based upon a total weight of solids in the total coating matrix. Further discussion of possible cure catalysts can be found in U.S. Pat. No. 4,863,520 to Factor et al.

These IR absorbing coatings can be employed on IR absorbing articles independently or with additive(s). In the case of additive(s), the location of the additives (e.g., ATO and $LaB_6$) is not limited (e.g., in the substrate and/or the layer(s)), with the location of those additive(s) being dictated by practical considerations. For example, since a more uniform additive loading can sometimes be attained in the substrate than in a coating (e.g., substrates can be molded to a uniform thickness, while coatings may have a greater variability in thickness depending on the coating method), the additives are generally located in the substrate (e.g., in the polycarbonate composition). ITO is not generally compatible with the polycarbonate, (i.e., it cannot just be added to the polycarbonate; for example, see EP2009057 B1 to Nakae, Paragraph [0002]). Hence the ITO is located in the coating. Therefore, the additive(s) (other than ITO), can generally be located anywhere in the article (coating and/or substrate). For example, an organic additive (e.g. Lumogen* IR765, a commercial BASF product) and/or an inorganic additive (e.g. $LaB_6$), and/or ATO, can be in a polycarbonate substrate, combined with a transparent conducting oxide (e.g., ITO (indium-doped tin oxide), and/or ATO (antimony-doped tin oxide)) in the coating.

Optionally, one or more of the coatings can be substituted with a film (e.g. polycarbonate or polyvinyl butyral) applied to the substrate by a method such as lamination or film insert molding. The film has spectral properties, either naturally, by virtue of additives it contains, or by virtue of a spectrally selective multi-layer structure carried by the film, that complement the spectral properties of the substrate and/or any coating(s), generally with their own respective additives. In this case, the coating(s) could be applied to the film and/or to the side of the substrate opposite the side with the film.

It is recognized that UV radiation blocking elements and abrasion-resistant elements must generally meet more stringent requirements on the exterior side of a vehicle or building, whereas IR absorbing coatings or films that are supplementing IR absorbing additives in the substrate, can also be effective on the interior side. Thus for applications, such as an automotive rooflite, where a UV blocking coating might provide abrasion-resistance that is both adequate and better than that of an IR absorbing coating, the UV- and IR-coatings would be located on the exterior and interior sides of the glazing respectively. In other applications, where a plasma-deposited abrasion-resistant coating is applied over any other coatings, e.g. with IR blocking function, the location(s) of the other coating(s) can be selected without regard for its abrasion-resistance. For example, in an embodiment, a silicone hard coat comprising ITO and colloidal silica can be located on both sides of the substrate (interior and exterior). In still another embodiment, e.g., where the system includes an IR reflecting element in addition to an IR absorbing element, wherein reflected wavelengths overlap the wavelengths absorbed by the IR absorbing element, it is desirable that light contact the IR reflecting element before reaching the IR absorbing element. Hence, in such a situation, the IR reflecting element can be located on the exterior and/or be within the substrate, while the IR absorbing element can be on the interior side, resulting in an asymmetric coating system (e.g., an asymmetric wet coating system).

The combined coating mixture (i.e., coating matrix with both ITO and colloidal silica) can be applied symmetrically, i.e. the same coating mixture can be applied to both sides of the substrate (e.g., glazing), while providing abrasion resistance and weatherability typical of the standard silicone hard coats, even when there is no plasma-deposited coating over the cured coating formed from the combined mixture. A symmetric coating system with ITO requires no extra manufacturing steps relative to a symmetric coating without ITO, such as a standard silicone hard coat. The coating can be applied in various fashions such as flow coating, dip coating, curtain coating, and so forth. The present process can be used to form various articles, such as for automotive glazing applications.

It is also noted that since $LaB_6$ is green in color, if added to a coating with a thickness gradient due to the application method (e.g., wedge effect manifested by flow coating and certain other coating methods), then the resulting coating could manifest a non-uniform color or appearance. Meanwhile, ITO nano-particles introduced into the polycarbonate substrate would lead to high haze.

The following examples are merely to further illustrate the present coating matrix, and coated articles, and is not intended to limit the scope hereof.

EXAMPLES

Examples 1-3 (Simulations)

The effects of various combinations of IR absorbing materials on Tts and Tvis were simulated. The absorption coefficient of each IR absorber was measured separately over the wavelength range 300 to 2,500 nm. For a mixture of additives with the respective loadings ($mg/cm^2$; based upon the total weight of the article) in Table 1 the transmission spectrum was determined from the Lambert-Beer law. Tvis was determined from the transmission spectrum using Equation 1 and Table 1 of ISO 9050:2003. The solar direct transmittance was determined from the transmission spectrum using Table 2 of ISO 13837:2008. The reflection spectrum was measured for a polycarbonate reference sample with thickness of 4 mm and with a silicone hard coat (namely AS4010 commercially available from Momentive Performance Materials). The solar direct reflectance was determined using Table 2 of ISO 13837:2008 in a manner analogous to that for solar direct transmittance, and is common to all the examples in Table 1. Tts was determined from the solar direct transmittance and solar direct reflectance using equations in Annex B of ISO 13837:2008 with wind velocity for "vehicles at rest".

TABLE 1

Additive Loadings[1] for Minimum Tts or Maximum Tvis, From Predictive Model Under Constraints Indicated

| | Additive Loading ($mg/cm^2$) | | | | | Transmission (%) | |
|---|---|---|---|---|---|---|---|
| Ex. Application | ITO | ATO | $LaB_6$ | Lumogen IR 765[4] | Yellow Dye R881 | Tts[2] (%) | Tvis[3] (%) |
| 1a Item 2 | 0 | 0.113 | 0.0474 | 0 | 0 | 58.82 | 70.00 |
| 1b Item 2 | 0.272 | 0 | 0.0470 | 0 | 0 | 54.36 | 70.00 |

TABLE 1-continued

Additive Loadings[1] for Minimum Tts or Maximum Tvis, From Predictive Model Under Constraints Indicated

| | Additive Loading (mg/cm$^2$) | | | | | Transmission (%) | |
|---|---|---|---|---|---|---|---|
| Ex. Application | ITO | ATO | LaB$_6$ | Lumogen IR 765[4] | Yellow Dye R881 | Tts[2] (%) | Tvis[3] (%) |
| 2a Item 2 | 0 | 0.107 | 0.0436 | 0 | 0 | 60.00 | 71.05 |
| 2b Item 2 | 0.277 | 0 | 0.0239 | 0 | 0 | 60.00 | 75.60 |
| 3a Rooflite | 0 | 0.244 | 0.26 | 0.026 | 0.07 | 30.00 | 23.83 |
| 3b Rooflite | 0.14 | 0 | 0.26 | 0.026 | 0.07 | 30.00 | 25.72 |

Bolded numbers denote constrained values.
[1]Additive loading is the total mass of an additive in the volume swept by translating a unit area of the sample surface through the sample in the direction perpendicular to that surface.
[2]Tts is based on ISO 13837:2008, Convention A.
[3]Tvis is based on ISO 13837:2008, Convention A
[4]Lumogen IR765 is quaterrylene dye (commercially available from BASF Corp.).

From Table 1 it is clear that the addition of the ITO to the article improved the Tts as well as the Tvis. In other words, Tts decreased and/or Tvis increased.

Example 4 (Effect on Coating Haze of Aging Period of ITO Coating Mixture at Room Temperature with Stirring Before Combining with Colloidal Silica Coating Mixture)

A primer solution was prepared by dissolving 4.01 g of polymethyl methacrylate (PMMA) into 29.36 g of diacetone alcohol and 166.53 g of 1-methoxy-2-propanol by stirring. The primer solution was applied to both sides of a polycarbonate substrate, allowed to evaporate at room temperature for 15 minutes, and baked in an oven at 125° C. for 0.5 hour. The resulting haze was 0.38% determined in accordance with ASTM D1003-11, procedure A with CIE standard illuminant C at a thickness of 3 to 5 micrometers (μm). An ITO coating mixture was prepared by combining 6.37 g n-butanol with 9.95 g ITO dispersion (30 wt % in isopropyl alcohol). To this mixture 7.3 g deionized water, 0.4 g acetic acid, and 18.3 g methyltrimethoxysilane were added with stirring. The ITO coating mixture was aged by stirring at room temperature (20° C.) for an aging period. The aged ITO coating mixture was combined with an equal volume of a colloidal silica coating mixture (e.g., AS4700). The combined mixture was stirred for 30 seconds and stored at room temperature without further stirring. The combined mixture was applied to one side of the polycarbonate substrate with the primer, allowed to stand for 15 minutes at room temperature, and cured in oven at 125° C. for 1 hour. As shown in Table 2, an aging period of the ITO coating mixture at room temperature with stirring should be greater than or equal to 24 hours, e.g., for the haze of the resulting cured coating to be less than 1%. Therefore, if at room temperature, it is desirable to age the ITO coating mixture for greater than or equal to 24 hours, specifically, greater than or equal to 48 hours, and more specifically, greater than or equal to 1 week, with agitation (e.g., stirring).

TABLE 2

Effect of Aging Period on Coating Haze (Example 4)

| Aging period of ITO coating solution at 20° C. with stirring | Mixture Appearance | Haze of Coating on PC Substrate With Primer (%)* |
|---|---|---|
| 4 hours | Turbidity | 15.8 |
| 8 hours | Turbidity | 10.6 |
| 10 hours | Clear blue solution; No turbidity | 5.26 |
| 12 hours | Clear blue solution; No turbidity | 3.41 |
| 16 hours | Clear blue solution; No turbidity | 1.68 |
| 24 hours | Clear blue solution; No turbidity | 0.98 |
| 18 days | Clear blue solution; No turbidity | 0.54 |

*ASTM D1003-11, Procedure A with CIE Standard Illuminant C
Primer is on both sides of PC substrate; Coating is on one side
Haze of PC substrate with primer was 0.38% before application of coating Examples 5-10 (Effect on Coating Haze of Aging of ITO Coating Mixture and/or Colloidal Silica Coating Mixture)

polycarbonate substrates with primer were prepared as in Example 4. ITO coating mixtures were prepared as in Example 4. Colloidal silica (CS) coating mixtures, for Examples 7 and 9 of Table 3, were prepared in accordance with Example 1 of U.S. Pat. No. 3,986,997 to Clark using acid-stabilized colloidal silica (Nalco 1034A, commercially available from Nalco Company) as the colloidal silica coating mixture, with aging changed to two weeks. Colloidal silica (CS) coating mixtures, for Examples 8 and 10 of Table 3, were prepared in accordance with Example 2 of U.S. Pat. No. 3,986,997 to Clark using ammonium-stabilized colloidal silica (Nalco 2327, commercially available from Nalco Company) as the colloidal silica coating mixture, with aging changed to two weeks. Mixtures were formed and coatings were applied and cured as in Example 4.

TABLE 3

Haze of Coatings From Mixture of ITO and CS Sources Indicated

| Ex. | ITO Source* | CS Source* | Ratio of Sources ITO:CS | Mixture Appearance-initial | Mixture Appearance-two weeks after mixing | Haze of Coating on PC Substrate with Primer (%)** |
|---|---|---|---|---|---|---|
| 5 | ITO coating solution, aged | CS dispersion, 40 wt % acid-stabilized CS in water | 2:1 | Precipitation | Precipitation | 3.69 |
| 6 | ITO coating solution, aged | CS dispersion, 40 wt % ammonium-stabilized CS in water | 2:1 | High turbidity | Precipitation | 51.9 |
| 7 | ITO dispersion, 30 wt % in IPA | CS coating solution with acid-stabilized CS, aged | 1:2 | High turbidity | Precipitation | 10.2 |
| 8 | ITO dispersion, 30 wt % in IPA | CS coating solution with ammonium-stabilized CS, aged | 1:2 | High turbidity | Precipitation | 12.5 |
| 9 | ITO coating solution, aged | CS coating solution with acid-stabilized CS, aged | 1:1 | Clear blue solution; No turbidity | Clear blue solution; No turbidity | 0.69 |
| 10 | ITO coating solution, aged | CS coating solution with ammonium-stabilized CS, aged | 1:1 | Clear blue solution; No turbidity | Clear blue solution; No turbidity | 0.78 |

*ITO coating mixtures and CS coating mixtures were aged by stirring at 20° C. for two weeks
**ASTM D1003-11, Procedure A with CIE Standard Illuminant C
Primer is on both sides of PC substrate; Coating is on one side
Haze of PC substrate with primer was 0.38% before application of coating Table 3 shows that the combination of two aged coating solutions (Examples 9 and 10) yielded a coating with haze less than 1%. This finding applied to both acid-stabilized colloidal silica (CS) (Example 9) and ammonium-stabilized colloidal silica (Example 10). It is noted that although two weeks of aging were used in the example, shorter aging times are believed possible, even when aging at room temperature and while attaining a haze of less than 1%. For example, aging of greater than or equal to 24 hours, specifically, greater than or equal to 48 hours, and more specifically, greater than or equal to 1 week, with agitation (e.g., stirring). Times may be further decreased with heating of the mixtures.

Examples 11-14 (Taber Abrasion Resistance)

One of the problems encountered with the addition of ITO to the silicone hard coat was the increase in Taber delta haze as compared to the same silicone hard coat without the ITO.

Polycarbonate (PC) substrates with primer were prepared as in Example 4. For Example 11, a colloidal silica coating mixture (AS4700) was applied to the polycarbonate substrate with primer, allowed to stand for 15 minutes at room temperature, and cured in oven at 125° C. for 1 hour. For Examples 12-14 an ITO coating mixture was prepared as in Example 4, except that, in these examples, the ITO amount was such that, after the ITO coating mixture was combined with the colloidal silica coating mixture in a 1:2 weight ratio the loading of ITO in the resulting cured coating was the same as for Example 3b. The ITO coating mixture was aged at room temperature (20° C.) with stirring for 14 days before being combined with the colloidal silica coating mixture to form a combined mixture. The combined mixture was applied to the polycarbonate substrate with the primer, allowed to stand for 15 minutes at room temperature, and cured in oven at 125° C. for 1 hour.

TABLE 4

Taber Abrasion Resistance

| Ex. | Weight Ratio of Mixtures ITO:CS | wt % TBAA* | ITO Coating Mixture** | Taber delta haze (%)*** |
|---|---|---|---|---|
| 11 | 0:1 | 0.4 | — | 4.1 |
| 12 | 1:2 | 0.4 | Unextracted | 7.6 |
| 13 | 1:2 | 0.4 | Extracted | 4.3 |
| 14 | 1:2 | 0.6 | Unextracted | 4.0 |

*based upon total weight of solids in the cured coating.
**treatment of the ITO coating mixture before it is combined with colloidal silica coating mixture (namely AS4700); not believed necessary if the original ITO dispersion is sufficiently pure.
***Taber Protocol: ASTM D1044-08, CF-10F Wheels, 500 g Load, 500 Cycles Table 4, Example 12, illustrates that a coating formed from the 1:2 weight ratio mixture has much higher Taber delta haze (7.6%) than a coating formed from pure colloidal silica coating mixture (4.1%, Example 11) when both coatings contain 0.4 wt % of TBAA and when no steps are taken to purify the ITO coating mixture. Table 4 indicates two ways to achieve Taber comparable to pure colloidal silica coating mixture: (i) at least partially purify (e.g. by extraction) the ITO dispersion before blending with the colloidal silica coating mixture (Example 13); and/or increase the TBAA loading, e.g. to 0.6% (Example 14).

For Example 13, 25 g of the ITO coating mixture was shaken with 50 g of water. After settling for several minutes, the aqueous phase was decanted from the residual blue slurry, and the extraction was repeated twice using 25 g of water each time. The residual blue slurry was then redispersed in sufficient 1-methoxy-2-propanol to give a blue solution with the same solids level of the original ITO coating mixture. One part of this ITO coating mixture was combined with 2 parts of the colloidal silica coating mixture and adjusted to contain 0.4% TBAA catalyst. The combined mixture was applied to the polycarbonate substrate with the primer and cured for 1 hour at 125° C. The Taber delta haze was 4.3%, which is comparable to the Taber delta haze for Example 11.

For Example 14 one part of the unextracted ITO coating mixture was blended with 2 parts of colloidal silica coating mixture and adjusted to contain 0.6% TBAA catalyst. The combined mixture was applied to the polycarbonate substrate with the primer and cured for 1 hour at 125° C. The Taber delta haze was 4.0, which is comparable to the Taber delta haze for Example 11.

Examples 13 and 14 show that an inhibition of the cure, possibly due to impurities in the ITO dispersion, can be remedied by purification of the ITO coating mixture or by adding more cure catalyst. Alternatives to extraction would be to purify the ITO dispersion or the ITO coating mixture (e.g., by ion exchange) and/or to produce the ITO dispersion with adequate purity at the outset.

Employment of multiple additives in multiple different locations can enable tuning of the transmission spectrum of an article. The use of different locations also enables the use of incompatible materials (i.e., if they were co-located). The ability to distribute additives among multiple locations also helps overcome additive concentration limitations, e.g., related to haze generation (e.g. due to agglomeration of additive particles) and/or to processing requirements (e.g. for injection molding). It also enables use of a common substrate resin (with some baseline additive(s)) for multiple applications, combined with selective use of additional additives in glazing elements other than the substrate, to efficiently accommodate a range of applications with a range of spectral requirements.

In an embodiment, a method for making an infrared radiation absorbing coating comprises: forming an ITO coating mixture comprising ITO and a first coating matrix, wherein the first coating matrix comprises the partial condensate of a silanol of the formula $R_nSi(OH)_{4-n}$, where n equals 1 or 2, and wherein R is selected from a $C_{1-3}$ alkyl radical, a vinyl radical, a 3,3,3-trifluoropropyl radical, a gamma-glycidoxypropyl radical, and a gamma-methacryloxypropyl radical, wherein the ITO coating mixture is free of colloidal silica; forming a colloidal silica coating mixture comprising colloidal silica and a second coating matrix, wherein the second coating matrix comprises the partial condensate of a silanol of the formula $R_nSi(OH)_{4-n}$, where n equals 1 or 2, and wherein R is selected from an alkyl radical of 1 to 3 inclusive carbon atoms, a vinyl radical, a 3,3,3-trifluoropropyl radical, a gamma-glycidoxypropyl radical, and a gamma-methacryloxypropyl radical; and mixing the ITO coating mixture with the colloidal silica coating mixture to form a combined mixture. The combined mixture does not comprise a precipitate visible to the unaided eye after 2 weeks without stirring.

In an embodiment, a silicone coating composition comprises: a coating matrix, comprising the partial condensate of a silanol of the formula $R_nSi(OH)_{4-n}$, where n equals 1 or 2, and wherein R is selected from a $C_{1-3}$ alkyl radical, a vinyl radical, a 3,3,3-trifluoropropyl radical, a gamma-glycidoxypropyl radical, and a gamma-methacryloxypropyl radical; colloidal silica; and ITO having a mean particle size of less than or equal to 60 nm as determined by dynamic light scattering.

In another embodiment, a silicone coating composition comprises: a coating matrix comprising the partial condensate of a silanol of the formula $R_nSi(OH)_{4-n}$, where n equals 1 or 2, and wherein R is selected from a $C_{1-3}$ alkyl radical, a vinyl radical, a 3,3,3-trifluoropropyl radical, a gamma-glycidoxypropyl radical, and a gamma-methacryloxypropyl radical; ITO having a mean particle size of less than or equal to 60 nm as determined by dynamic light scattering; and wherein the silicone coating is free of colloidal silica.

In another embodiment, a coated glazing comprises: a plastic substrate; and a cured silicone coating on the substrate. The cured silicone coating was formed from a composition consisting essentially of a coating matrix, comprising the partial condensate of a silanol of the formula $R_nSi(OH)_{4-n}$, where n equals 1 or 2, and wherein R is selected from an alkyl radical of 1 to 3 inclusive carbon atoms, a vinyl radical, a 3,3,3-trifluoropropyl radical, a gamma-glycidoxypropyl radical, and a gamma-methacryloxypropyl radical; colloidal silica; ITO having a mean particle size of less than or equal to 60 nm as determined by dynamic light scattering; and optionally an additive selected from the group consisting of a UV absorber, a surfactant, a plasticizer, IR absorber, cure catalyst, colorant, antistat, antibacterial a flow additive, an anti-oxidant, a dispersant, compatibilizer, and a combination comprising at least one of the foregoing additive. The coated glazing has a haze of less than or equal to 3% as measured in accordance with ASTM D1003-11, procedure A with CIE standard illuminant C.

In the various embodiments: (i) forming the ITO coating mixture further comprises aging the ITO coating mixture; and/or (ii) no polymeric dispersant is added to the ITO coating mixture, the colloidal silica coating mixture, or the combined mixture; and/or (iii) the first coating matrix and the second coating matrix are the same; and/or (iv) the coating composition comprises less than or equal to 0.05 parts by mass polymeric dispersant with respect to 1 part by mass ITO; and/or (v) the coating composition comprises 0 parts by mass polymeric dispersant; and/or (vi) wherein greater than or equal to 90% of ITO particles have a diameter of less than 61 nm; and/or (vii) further comprising UV absorbing additives; and/or (viii) further comprising a quaternary ammonium salt of a carboxylic acid; and/or (ix) wherein the ITO coating mixture comprises the quaternary ammonium salt of the carboxylic acid; and/or (x) further comprising a cure catalyst selected from tetra-n-butylammonium acetate (TB AA), tetra-n-butylammonium formate, tetra-n-butylammonium benzoate, tetra-n-butylammonium-2-ethylhexanoate, tetra-n-butylammonium-p-ethylbenzoate, tetra-n-butylammonium propionate, and combinations comprising at least one of the foregoing; and/or (xi) wherein the coated glazing has a $T_{vis}$ of greater than or equal to 70% and a $T_{ts}$ of less than or equal to 60%; and/or (xii) wherein the plastic substrate comprises a material selected from polycarbonate resin, acrylic polymers, polyacrylate, polyester, polysulfone resins, and combinations comprising at least one of the foregoing; and/or (xiii) wherein the haze is less than or equal to 2%; and/or (xiv) wherein the haze is less than or equal to 1%; and/or (xv) further comprising a UV protective coating on both sides of the plastic substrate; and/or (xvi) further comprising a UV protective coating on one side of the plastic substrate and an IR coating on an opposite side of the plastic substrate; and/or (xvii) wherein the composition comprises an amount of polymeric dispersant such that if the ITO were mixed directly with the colloidal silica coating mixture to form a sample mixture having the same amount of polymeric dispersant as the combined mixture, visible precipitation occurs in the sample mixture in less than or equal to one week with no agitation.

In general, the invention may alternately comprise, consist of, or consist essentially of, any appropriate components herein disclosed. The invention may additionally, or alternatively, be formulated so as to be devoid, or be substantially free, of any components, materials, ingredients, adjuvants or species used in the prior art compositions or that are otherwise not necessary to the achievement of the function and/or objectives of the present invention.

All ranges disclosed herein directed to the same component or property are inclusive of the endpoints, and the endpoints are independently combinable with each other (e.g., ranges of "up to 25 wt. %, or, more specifically, 5 wt. % to 20 wt. %," is inclusive of the endpoints and all intermediate values of the ranges of "5 wt. % to 25 wt. %," such as 10 wt % to 23 wt %, etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "front", "back", "bottom", and/or "top" are used herein, unless otherwise noted, merely for convenience of description, and are not limited to any one position or spatial orientation. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A method for making an infrared radiation absorbing coating mixture, comprising:
    forming an ITO coating mixture comprising ITO and a first coating matrix, wherein the first coating matrix comprises a first partial condensate of a first silanol wherein the first silanol comprises greater than or equal to 70 wt % of silanol of the formula $CH_3Si(OH)_3$ based on a total weight of the first silanol in the first coating matrix, wherein the ITO coating mixture is free of a colloidal silica; wherein no polymeric dispersant is added to the ITO coating mixture; wherein the ITO coating mixture comprises 10 to 50 wt % solids, wherein the solids comprise 10 to 70 wt % ITO and 30 to 90 wt % of the first partial condensate;
    forming a colloidal silica coating mixture comprising colloidal silica and a second coating matrix, wherein the second coating matrix comprises a second partial condensate of a second silanol wherein the second silanol comprises greater than or equal to 70 wt % of silanol of the formula $CH_3Si(OH)_3$ based on a total weight of the second silanol in the second coating matrix; wherein the colloidal silica coating mixture comprises 10 to 50 wt % solids, wherein the solids comprise 10 to 80 wt % of the colloidal silica and 20 to 90 wt % of the second partial condensate;
    wherein one or both of the colloidal silica coating mixture and the ITO coating mixture comprise a sufficient amount of an acid to provide a pH of 3.0 to 6.0; and
    mixing the ITO coating mixture with the colloidal silica coating mixture to form the infrared radiation absorbing coating mixture;
    and
    wherein the infrared radiation absorbing coating mixture does not comprise a precipitate visible to an unaided eye after 2 weeks without stirring; and
    wherein the ITO comprises particles and wherein greater than or equal to 90% of ITO particles have a diameter of less than 61 nm.

2. The method of claim 1, wherein forming the ITO coating mixture further comprises aging the ITO coating mixture.

3. The method of claim 1, wherein no polymeric dispersant is added to the colloidal silica coating mixture or the infrared radiation absorbing coating mixture.

4. The method of claim 1, wherein the first coating matrix and the second coating matrix are the same.

5. The method of claim 1, wherein the infrared radiation absorbing coating mixture comprises an amount of polymeric dispersant such that if the ITO were mixed directly with the colloidal silica coating mixture to form a sample mixture having the same amount of polymeric dispersant as the infrared radiation absorbing coating mixture, visible precipitation occurs in the sample mixture in less than or equal to one week with no agitation.

6. The method of claim 1, wherein the ITO has a mean particle size of less than or equal to 60 nm as determined by dynamic light scattering.

7. The method of claim 1, wherein the infrared radiation absorbing coating mixture comprises less than or equal to 0.05 parts by mass polymeric dispersant with respect to 1 part by mass ITO.

8. The method of claim 1, wherein one or both of the colloidal silica coating mixture and the ITO coating mixture comprise a UV absorber.

9. The method of claim 1, further comprising aging one or both of the colloidal silica coating mixture and the ITO coating mixture prior to the mixing; wherein the aging comprises agitating for greater than or equal to 24 hours or agitating for greater than or equal to 1 hour at a temperature of 35 to 65° C.

10. The method of claim 1, further comprising applying the infrared radiation absorbing coating mixture to a substrate.

11. The method of claim 1, further comprising adding a cure catalyst to one or more of the colloidal silica coating mixture, the ITO coating mixture, and the infrared radiation absorbing coating mixture.

12. The method of claim 11, wherein the cure catalyst comprises a quaternary ammonium salt of a carboxylic acid.

13. The method of claim 11, wherein the cure catalyst comprises tetra-n-butylammonium acetate (TBAA), tetra-n-butylammonium formate, tetra-n-butylammonium benzoate, tetra-n-butylammonium-2-ethylhexanoate, tetra-n-butylammonium-p-ethylbenzoate, tetra-n-butylammonium propionate, and combinations comprising at least one of the foregoing.

14. The method of claim 11, wherein the cure catalyst is present in an amount of less than or equal to 2 wt % based upon a total weight of solids in the respective first coating matrix or second coating matrix.

* * * * *